United States Patent [19]

Lehto

[11] Patent Number: 4,853,195
[45] Date of Patent: Aug. 1, 1989

[54] FLUE GAS SCRUBBER SYSTEM

[75] Inventor: John M. Lehto, Cokato, Minn.

[73] Assignee: Northern States Power Company, Minneapolis, Minn.

[21] Appl. No.: 61,217

[22] Filed: Jun. 12, 1987

Related U.S. Application Data

[62] Division of Ser. No. 872,118, Jun. 9, 1986, Pat. No. 4,762,686.

[51] Int. Cl.$^4$ .............. B01D 47/02; B01D 50/00; B01D 53/34
[52] U.S. Cl. ............................ 423/242; 422/168; 422/169; 422/170; 422/220; 422/274; 55/255; 55/256; 55/257.1; 261/121.1
[58] Field of Search ........... 422/168, 169, 170, 220, 422/274; 55/255, 256, 257; 261/121 R; 423/242 A, 243

[56] References Cited

U.S. PATENT DOCUMENTS

| | | | |
|---|---|---|---|
| 2,787,454 | 4/1957 | Coppola | 261/122 |
| 3,647,360 | 3/1982 | Jaeger | 23/168 |
| 3,836,630 | 9/1974 | Noguchi et al. | 423/242 A |
| 3,980,458 | 9/1976 | Berthoud | 55/255 X |
| 3,993,448 | 11/1976 | Lowery, Sr. | 55/227 X |
| 3,998,613 | 12/1976 | Attig | 55/256 |
| 4,099,925 | 1/1978 | Yanagioka et al. | 55/73 X |
| 4,132,537 | 1/1979 | Bennett | 55/226 |
| 4,156,712 | 5/1979 | Kanai et al. | 423/242 A |
| 4,229,417 | 10/1980 | Kanai et al. | 422/227 X |
| 4,239,515 | 12/1980 | Yanagioka et al. | 55/223 |
| 4,323,371 | 4/1982 | Ritvanen | 55/19 |
| 4,366,132 | 12/1982 | Holter et al. | 423/242 |
| 4,368,060 | 1/1983 | Yanagiako et al. | 55/73 |
| 4,400,355 | 8/1983 | Donnelly et al. | 422/170 |

Primary Examiner—Barry S. Richman
Assistant Examiner—Lynn M. Kummert
Attorney, Agent, or Firm—Merchant, Gould, Smith, Edell, Welter & Schmidt

[57] ABSTRACT

A scrubber module (16) of the wet type includes a partition (26) extending across the upper end of a tank (20) between the dirty flue gas inlet (28) and the clean flue gas outlet (30). The partition (26) takes the form of a plurality of hollow fingers (32), the zig-zag lower edge of which is submerged in the aqueous absorbent (22). Oxygen-containing gas such as air is introduced into the lower end of the tank (20) as the flue gas is forced underneath the partition (26) at the upper end of the tank without pre-cleaning of the flue gas to facilitate wetting and capture of the fly ash particulate as well as oxidation and adsorption of the sulfur dioxide into calcium sulfate in solution, in the same vessel.

12 Claims, 3 Drawing Sheets

FLUE GAS SCRUBBER SYSTEM

CROSS REFERENCE TO RELATED APPLICATION

This is a division of co-pending application Ser. No. 872,118 filed June 9, 1986, now U.S. Pat. No. 4,762,686.

TECHNICAL FIELD

The present invention relates generally to a gas/liquid contacting device. More particularly, this invention concerns an improved wet scrubber module for simultaneously removing both fly ash and sulfur dioxide from the flue gas of a power plant before discharge into the atmosphere.

BACKGROUND OF THE INVENTION

Scrubber systems have been developed for controlling harmful emissions from industrial and utility boilers like those used in power plants. Such scrubber systems are generally of either the dry or wet types. Dry scrubber systems generally include an open chamber in which the flue gas is directed through a liquid spray of lime and fly ash slurry. A reaction occurs with the sulfur dioxide in the gas to form a calcium compound in dry particulate for which can then be collected at the outlet of the chamber, thereby "scrubbing" the flue gas free of sulfur dioxide pollutants.

On the other hand, in the so-called "wet scrubbers" the sulfur dioxide is not collected in dry particulate form, but rather is collected in the form of a slurry in a tank of aqueous absorbent for periodic removal in liquid slurry form. In order to avoid excessive maintenance costs from the build-up of deposits of fly ash, the fly ash must first be removed by means of filtration or electrostatic precipitation before the flue gas can be treated in a wet scrubber. This results in two large, expensive structures. Further, since the fly ash is typically removed separately, the alkalinity which otherwise would have been added by the presence of fly ash is not present, and thus some of the fly ash which was removed must then be added to the aqueous absorbent, which of course adds further expense and complication.

U.S. Pat. No. 3,836,630 shows a system wherein sulfur dioxide absorption and oxidation is carried out in separate vessels.

U.S. Pat. Nos. 4,156,712 and 4,229,417 disclose a method and apparatus for removing sulfur dioxide from flue gases by simultaneous absorption and oxidation in an aqueous absorbent within a single vessel. As the liquid absorbent in the vessel is agitated, flue gas is sparged into the upper region as oxygen-containing gas is sparged into the lower region of the body of liquid absorbent. Alkaline material is introduced into the body of liquid absorbent which fixes the sulfur dioxide in the form of a sulfate which then precipitates out in solution for removal. These references suggest that gas/liquid contacting and solid (fly ash) precipitation can be carried out in the same device, however, since the flue gas is introduced into the upper region of the liquid absorbent via perforate or notched pipes, at least some pre-scrubbing of the fly ash particulate therefrom is required to avoid clogging.

A need has thus arisen for an improved flue gas scrubber system of the wet scrubber type which does not require pre-removal of the fly ash, so that particulate removal and sulfur dioxide removal and can be accomplished simultaneously in the same device without the expense and additional complication of a baghouse or precipitator upstream.

SUMMARY OF INVENTION

The present invention comprises an improved flue gas scrubber system which overcomes the foregoing and other difficulties associated with the prior art. In accordance with the invention, there is provided a flue gas scrubber system of the wet scrubber type which is particularly adapted for removing both fly ash particulate by wetting, and sulfur dioxide gas by absorption and oxidation, from the flue gas of a power plant in one step. The lower end of the chamber inside the scrubber module is filled with aqueous absorbent having a controlled pH between about 3.5 and 5, while the upper end is divided by a vertical partition into two subchambers. Dirty flue gas from the boiler is received in one subchamber, while scrubbed or clean flue gas leaves the other subchamber on the other side of the partition for exhaust through a stack to the atmosphere. The partition takes the form of a zig-zag or corrugated vertical side wall, the upper edges of which are closed by top walls in order to define a series of hollow "fingers". The lower edges of the side walls are continuous and are submerged in the liquid absorbent. As raw flue gas enters the scrubber chamber, it is directed into the ends of the fingers of the partition, downward around their submerged lower edges and through the liquid absorbent. Simultaneously, an oxygen-containing gas such as air is injected into the lower region of the aqueous absorbent beneath the partition, as the absorbent is agitated. The fly ash in the flue gas provides the primary reagent to react with the sulfur dioxide to form a sulfate that precipitates out of solution and can then be removed as fly ash slurry. If desired, additional calcium compound, such as limestone, can be added to the aqueous absorbent for best efficiency.

DESCRIPTION OF DRAWINGS

A better understanding of the invention can be had by reference to the following Detailed Description in conjunction with the accompanying Drawings, wherein:

FIG. 3 is a partial perspective view of the vertical partition located in the scrubber module.

DETAILED DESCRIPTION

Figure 1:
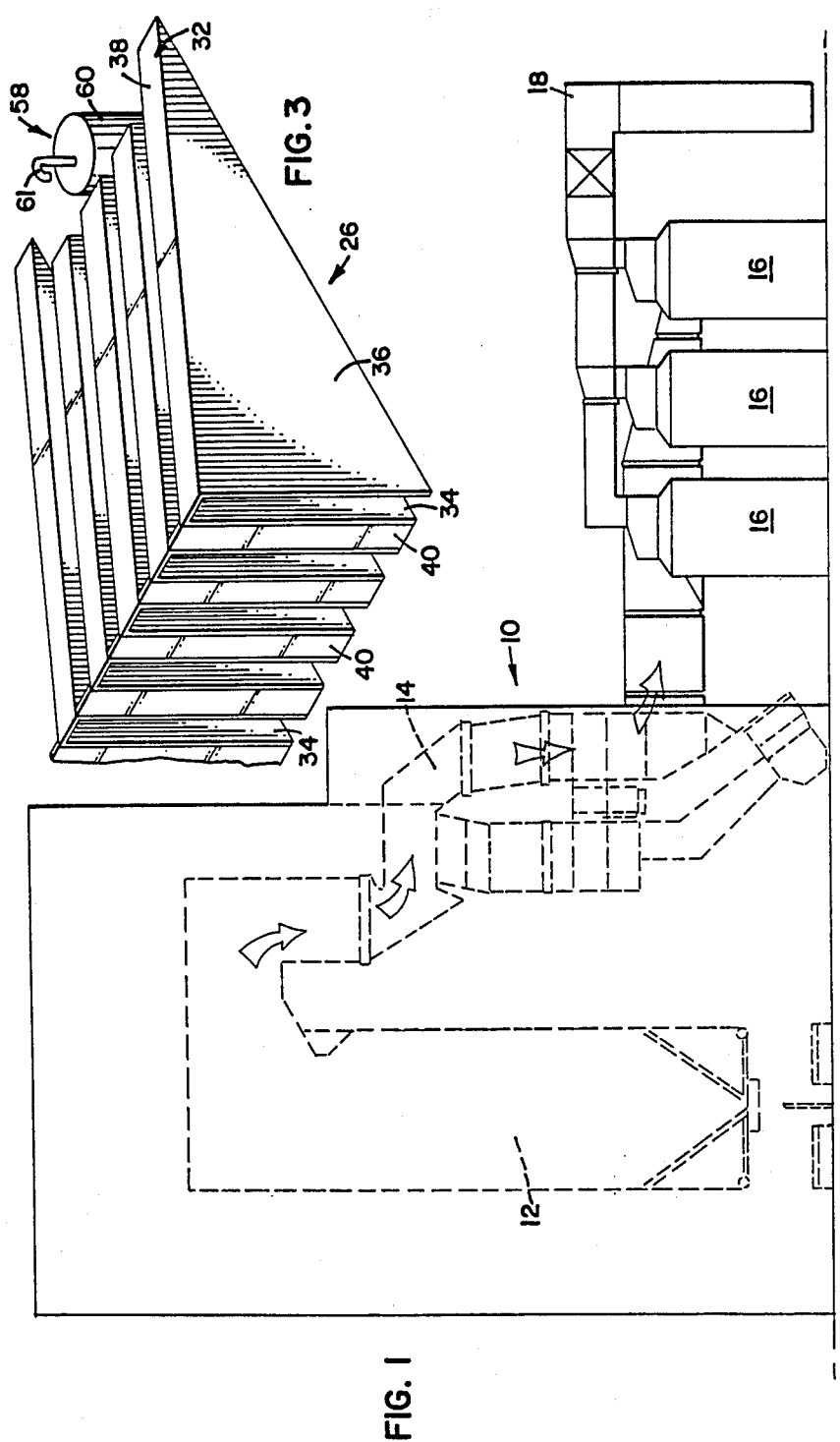
FIG. 1 is a partial schematic view of a power plant including a boiler and several scrubber modules for removing pollutants from the boiler flue gas before discharge into the atmosphere.

Referring now to the Drawings, wherein like reference numerals designate like or corresponding elements throughout the views, and particularly referring to FIG. 1, there is shown a part of a power plant 10 of the type employed by utility companies for generating electricity. The power plant 10 includes a boiler 12 which generates steam for driving a turbine that turns a generator to generate electricity. The boiler 12 is fired by coal, the particular sulfur content of which depends upon the origin of the coal. Coal of low sulfur content is preferred because of the lesser difficulty in meeting pollution control standards, although coal of relatively higher sulfur content is more typical. The flue gas from boiler 12 is directed through duct work 14 to several wet scrubber modules 16, only three of which are shown. In practice, twelve scrubber modules 16 are provided for reserve capacity during peak periods of power generation, and so that some of scrubber modules can be taken off line for repair and maintenance without affecting overall performance of the power plant 10. After passing through the scrubber modules 16, the scrubbed flue gas passes through duct work 18 containing induced draft fans (not shown) for exhaust through a stack to the atmosphere. As will be explained more fully hereinafter, the scrubber modules 16 are of improved construction so as to provide for simultaneous fly ash and sulfur dioxide removal with improved efficiency and reduced cost.

Figure 2:
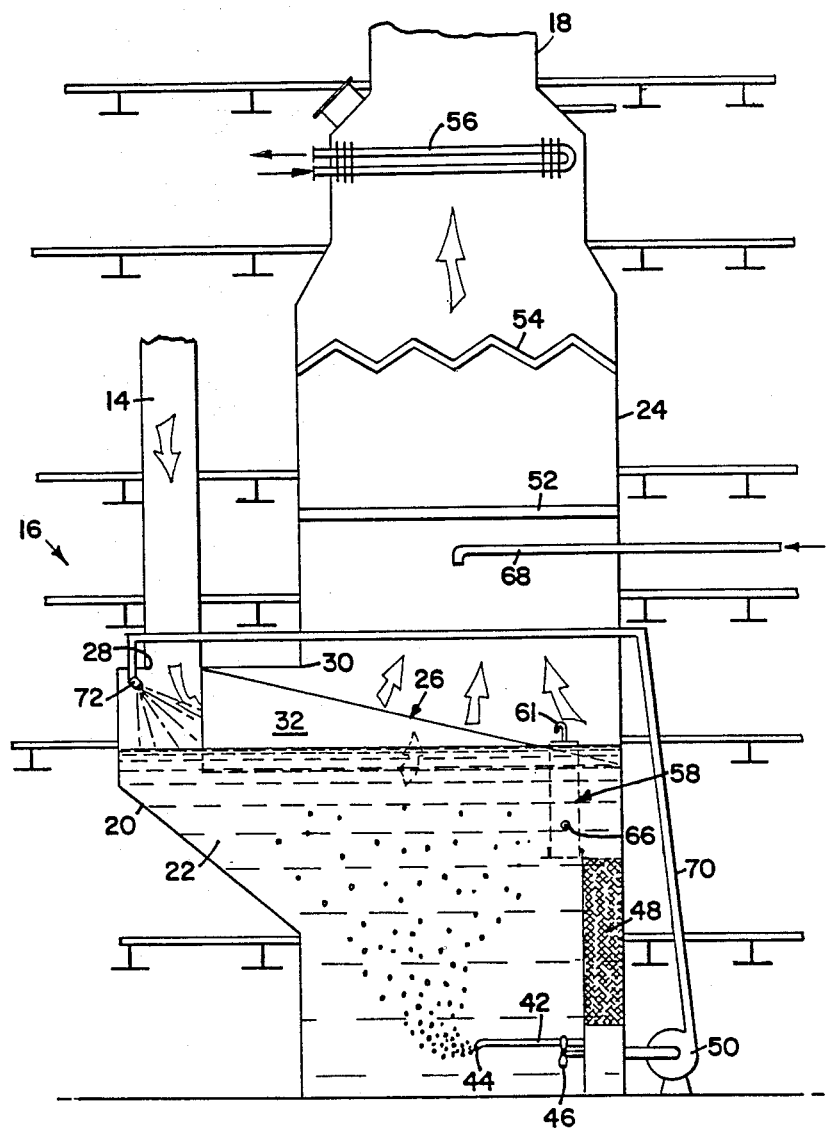
FIG. 2 is a vertical cross-sectional schematic view of one of the improved scrubber modules of the present invention.

Referring now to FIGS. 2 and 3, there is shown the internal construction of one of the scrubber modules 16. The scrubber module 16 includes a vessel or tank 20 which is partially filled with aqueous absorbent 22. The aqueous absorbent 22 basically comprises water and the fly ash particulate from the incoming flue gas, although a suitable amount of crushed limestone can be added as desired to obtain the desired pH, as will be explained more fully hereinafter. The upper end of the tank 20 is connected to the duct work 14 leading from boiler 12, as well as to a spray tower 24 and duct work 18 leading to the exhaust stack (not shown).

Referring now to FIG. 3 in conjunction with FIG. 2, a vertical partition 26 is secured across the upper end of tank 20 between the flue gas inlet 28 and the outlet 30. The partition 26 comprises a plurality of generally parallel fingers 32 of hollow construction arranged in parallel, spaced apart relationship across the upper end of the tank 20. The fingers 32 can be rectangular, but are preferably each of generally right triangular configuration to reduce material cost. Each finger 32 is preferably constructed of stainless steel and includes a pair of side walls 34 and 36 and an inclined top wall 38. End walls 40 are connected between adjacent edges of the open divergent ends of the fingers 32 so that all of the flue gas entering inlet 28 is directed into the hollow fingers 32 of the partition 26. It will thus be appreciated that the partition 26 forms a zig-zag partition comprised of a number of vertical side walls 34 and 36 and connecting top walls 38 and end walls 40 extending across the upper end of tank 20. The zig-zag continuous lower edge of the partition 26 is submerged into the surface of the aqueous absorbent 22.

The flue gas from boiler 12 entering inlet 28 via duct work 14 is at about 300 degrees F. This dirty flue gas enters the tank 20 and is directed into the fingers 32 of the partition 26. The flue gas then passes around the zig-zag lower edge of the partition 26 and bubbles upwardly through the aqueous absorbent 22 in the upper region of tank 20 and out onto the opposite side of the partition. Simultaneously, an oxygen-containing gas, such as air, is introduced into the lower region of the aqueous absorbent 22 through a pipe 42. The pipe 42 preferably includes a downwardly-turned end 44 to prevent backflow of aqueous absorbent 22 therein. An agitator 46 is also provided in the tank 20 for circulation. The oxygen containing gas from pipe 42 bubbles upwardly through the aqueous absorbent 22 in tank 20 until it joins with the flue gas bubbling underneath the partition 26, whereupon the fly ash and sulfur dioxide in the flue gas reacts with the calcium and oxygen in the aqueous absorbent 22 to form calcium sulfate, which then precipitates out of solution and collects within the tank 20 in accordance with wellknown chemical reactions. The agitator 46 helps to keep the calcium sulfate suspended in solution in the aqueous absorbent 22, which in effect becomes a slurry. The slurry can be selectively withdrawn through a screened outlet 48 via pump 50.

The scrubbed or clean flue gas enters outlet 30 at about 130 degrees F, passing upwardly in tower 24 first through a conventional bulk entrainment separator 52 and then through a conventional mist eliminator 54 to remove excess moisture.

In the preferred embodiment, the scrubber module 16 includes a reheater coil 56 in the upper end of tower 24 after the mist eliminator 54 for heating the scrubbed flue gas to a temperature of about 160 degrees F in order to increase gas buoyancy and reduce condensation and thus corrosion in the duct work 18. The reheater coil 56 can be connected to the de-aerator (not shown) or any other suitable source of heat.

Figure 4:
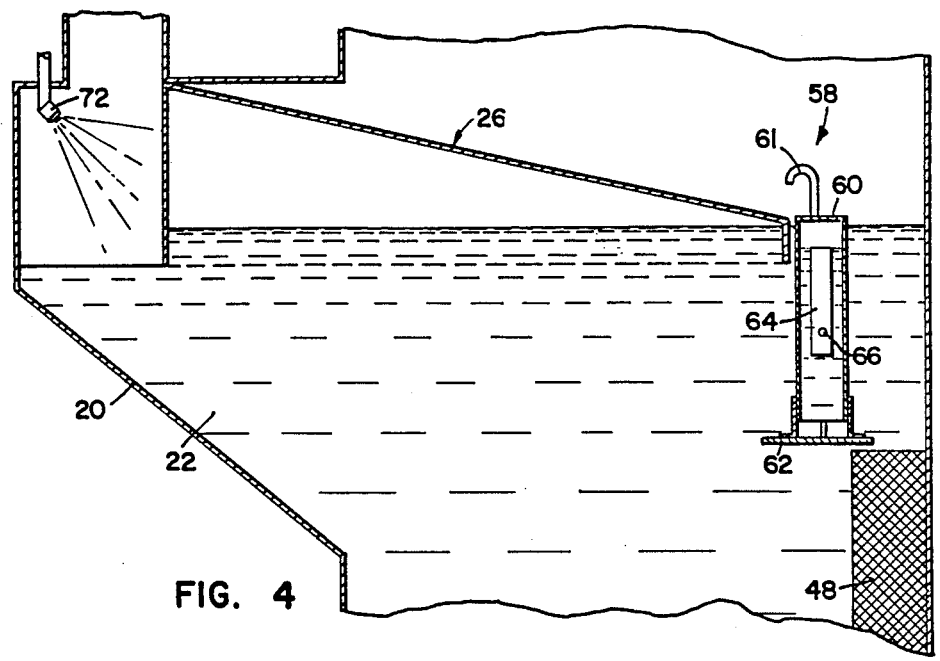
FIG. 4 is an enlarged partial vertical sectional view of the scrubber module.

Referring again to FIG. 2 in conjunction with FIG. 4, the scrubber module 16 of the invention preferably includes a level control 58 for maintaining proper level of aqueous absorbent 22 in the tank 20. The level control 58 comprises an outer tube 60 having a closed upper end and an open bottom end. A plate 62 is suspended in spaced apart relationship from the open bottom end of the outer tube 60 to prevent bubbles from pipe 42 from entering. An inner tube 64 is positioned inside the outer tube 60. The inner tube 64 includes an open top end and a closed bottom end. In this manner excess aqueous absorbent 22 fills the outer tube 60 and spills over into the inner tube 64 for withdrawal by means of overflow pipe 66 which is connected to the inner tube and extends in sealing engagement through the outer tube and on out through the tank 20.

Additional make-up water can be added to tank 20 through pipe 68.

It will be noted that the water level on opposite sides of partition 26 is different. The pressure drop across partition 26 is about 10–15 inches of water, depending upon the scrubbing efficiency desired.

Referring again to FIG. 2, the scrubber module 16 preferably includes a line 70 leading from pump 50 to nozzles 72, only one of which is shown, positioned to discharge slurry from tank 20 onto the inside of fingers 32. Nozzles 72 can be actuated periodically for purposes of cleaning partition 26 and quenching the incoming flue gas to a temperature of about 140–150 degrees F for more effective operation.

As indicated above, the pH of the aqueous absorbent 22 ranges between about 3 and 6, and preferably between 3.5 and 5.0. It will be understood that the aqueous absorbent contains both the fly ash and the sulfur dioxide removed from the flue gas, and their chemical combinations with water, oxygen, fly ash constituents, and any additional alkaline material added as necessary to control pH. For example, a slurry of crushed limestone can be added to the aqueous absorbent for pH control. It has been found experimentally that 70% sulfur dioxide removal could be achieved from flue gas containing 600 ppm fly ash particulate with aqueous absorbent of 3.5 pH, without any alkaline additives using only the available calcium in the fly ash for sulfur fixation as calcium sulfate. Alkaline material is added to the aqueous absorbent to control pH as necessary in accordance with the calcium content of the fly as the sulfur dioxide content of the flue gas, and the required percentage removal of sulfur dioxide from the flue gas.

From the foregoing, it will thus be apparent that the present invention comprises an improved flue gas scrubber system having several advantages over the prior art. One important advantage involves the fact that both fly ash removal and sulfur dioxide removal take place simultaneously in a single vessel, whereas in the past it was necessary to remove the fly ash before removing the sulfur dioxide. The present invention avoids the additional equipment, cost, and maintenance heretofore associated with preliminary fly ash removal. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications, and/or rearrangement of elements falling within the scope of the invention as defined by the following claims.

What is claimed is:

1. A method of simultaneously removing fly ash and sulfur dioxide pollutants from flue gas, comprising the steps of:

partially filling a tank with aqueous absorbent having sufficient water and alkaline material in order to maintain a pH between about 3 and 6;

positioning across the upper end of the tank an upright partition which extends entirely between opposite sides of the tank, in order to define two subchambers above the aqueous absorbent in the upper end of the tank, said partition including a plurality of horizontal fingers each bounded in part by interconnected spaced-apart side walls with end walls connected between adjacent fingers in order to define a continuous zig-zag lower edge submerged in said aqueous absorbent, directing dirty flue gas into one subchamber, down one side and around the continuous zig-zag lower edge of the partition, and into contact with the aqueous absorbent;

injecting oxygen-containing gas into the aqueous absorbent beneath the continuous zig-zag lower edge of the partition, whereby the fly ash and sulfur dioxide react with the aqueous absorbent to form calcium sulfate which precipitates out of solution;

agitating the aqueous absorbent to keep the calcium sulfate suspended in solution as a slurry;

directing the clean flue gas up the other side of the partition, out of the aqueous absorbent to keep the calcium sulfate suspended in solution as a slurry and into the other subchamber; and exhausting the clean flue gas from the other subchamber to atmosphere.

2. The method of claim 1, wherein the temperature of the dirty flue gas entering the tank is about 300° F.

3. The method according to claim 2, further including the steps of:

withdrawing aqueous absorbent from the tank; and spraying some of the withdrawn aqueous absorbent through the dirty flue gas entering said one subchamber and onto the adjacent one side of said partition, in order to lower the temperature of the flue gas to about 140–150° F. and to clean the partition.

4. The method of claim 1, wherein the pH of the aqueous absorbent is about 3.5–5.0.

5. The method of claim 1, wherein the temperature of the clean flue gas leaving the tank is about 130° F.

6. The method according to claim 5, further including the step of:

reheating the clean flue gas to a temperature of about 160° F.

7. The method of claim 1, further including the steps of:

withdrawing the slurry from the tank;

adding make-up water to the tank as necessary to maintain the aqueous absorbent at a desired level in the tank; and adding alkaline material to the tank as necessary to maintain the pH of the aqueous absorbent in the desired range.

8. A method of simultaneously removing fly ash and sulfur dioxide pollutants from flue gas, comprising the steps of:

partially filling a tank with aqueous absorbent having sufficient water and alkaline material in order to maintain a pH between about 3 and 6;

positioning across the upper end of the tank an upright partition which extends entirely between opposite sides of the tank, in order to define two subchambers above the aqueous absorbent in the upper end of the tank said partition including a plurality of horizontal fingers each bounded in part by interconnected spaced-apart side walls with end walls connected between adjacent fingers in order to define a continuous zig-zag lower edge submerged in said aqueous absorbent;

directing dirty flue gas into one subchamber, down one side and around the continuous zig-zag lower edge of the partition, and into contact with the aqueous absorbent;

injecting oxygen-containing gas into the aqueous absorbent beneath the continuous zig-zag lower edge of the partition, whereby the fly ash and sulfur dioxide react with the aqueous absorbent to form calcium sulfate which precipitates out of solution;

agitating the aqueous absorbent to keep the calcium sulfate suspended in solution as a slurry;

directing the clean flue gas up the other side of the partition, out of the aqueous absorbent, and into the other subchamber; directing the clean flue gas from the other subchamber upward through a spray tower; removing excess moisture from the clean flue gas; reheating the clean flue gas to a temperature of about 160° F.; and exhausting the clean flue gas to atmosphere.

9. The method of claim 8, wherein the temperature of the dirty flue gas entering the tank is about 300° F.

10. The method according to claim 9, further including the steps of:

withdrawing aqueous absorbent from the tank; and spraying some of the withdrawn aqueous absorbent through the dirty flue gas entering said one subchamber in order to lower the temperature of the flue gas to about 140–150° F.

11. The method of claim 8, wherein the pH of the aqueous absorbent is about 3.5–5.0.

12. The method of claim 8, wherein the temperature of the clean flue gas leaving the tank is about 130° F.

* * * * *